(12) United States Patent
Tanaka et al.

(10) Patent No.: US 6,288,765 B1
(45) Date of Patent: Sep. 11, 2001

(54) LIQUID CRYSTAL DISPLAY DEVICE HAVING IMPROVED THICKNESS UNIFORMITY

(75) Inventors: Keiichi Tanaka, Tenri; Tomohiko Yamamoto, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/407,745

(22) Filed: Sep. 28, 1999

(30) Foreign Application Priority Data

Oct. 1, 1998 (JP) .................................................. 10-280299
Aug. 2, 1999 (JP) .................................................. 11-219217

(51) Int. Cl.[7] ....................... G02F 1/1339; G02F 1/1333; G02F 1/13
(52) U.S. Cl. ............................. 349/153; 349/54; 349/192
(58) Field of Search ............................... 349/40, 42, 153, 349/192, 54, 190

(56) References Cited

U.S. PATENT DOCUMENTS

| | | | | |
|---|---|---|---|---|
| 5,668,032 | * | 9/1997 | Holmberg et al. | 438/144 |
| 5,729,309 | * | 3/1998 | Na et al. | 349/54 |
| 5,767,929 | * | 6/1998 | Yachi et al. | 349/40 |
| 5,841,490 | * | 11/1998 | Matsuo | 349/40 |
| 5,852,480 | * | 12/1998 | Yajima et al. | 349/40 |
| 5,859,679 | * | 1/1999 | Song | 349/54 |
| 5,953,086 | * | 9/1999 | Oogiichi et al. | 349/40 |
| 5,969,779 | * | 10/1999 | Kim et al. | 349/54 |
| 6,014,191 | * | 1/2000 | Kim et al. | 349/54 |
| 6,061,105 | * | 5/2000 | Nakagawa | 349/40 |
| 6,111,621 | * | 8/2000 | Kim et al. | 349/54 |

FOREIGN PATENT DOCUMENTS 62-133478  6/1987 (JP).
6-308510  11/1994 (JP).

OTHER PUBLICATIONS

"A New Active Matrix LCD Architecture for Larger Size Flat Display" by K. Oki, et al., in *ITEJ Technical Report*, vol. 11, No. 27, pp. 73–78 (1987). (In Japanese with translation of relevant passages.).

"New Electrodes Architectures for Liquid Crystal Displays Based on Thin Film Transistors", by J.F.Clerc, et al., in *Japan Display '86*, pp. 84–87 (1986).

* cited by examiner

*Primary Examiner*—William L. Sikes
*Assistant Examiner*—Tarifur R. Chowdhury
(74) *Attorney, Agent, or Firm*—Dike Bronstein, Roberts & Cushman LLP; David G. Conlin; David A. Tucker

(57) ABSTRACT

A pixel substrate of a liquid crystal display device of the present invention are equipped with gate bus lines, reference signal lines, gate signal input terminals, a reference signal trunk line, and reference signal input terminals. The reference signal trunk line is formed so as to run along all side edges of the pixel substrate except the left side edge which is on the gate signal input side, outside a display area of the pixel substrate (an area corresponding to a display area of a liquid crystal panel when completed), and is connected with every reference signal line. A sealing member for making the pixel substrate and a counter substrate adhere to each other is provided so as to be positioned on the reference signal trunk line 7.

14 Claims, 14 Drawing Sheets

LIQUID CRYSTAL DISPLAY DEVICE HAVING IMPROVED THICKNESS UNIFORMITY

FIELD OF THE INVENTION

The present invention relates to a liquid crystal display device, and particularly relates to a liquid crystal display device of an active matrix driving type, wherein source bus lines are provided on a counter substrate.

BACKGROUND OF THE INVENTION

Recently, liquid crystal display (LCD) devices have been increasingly demanded as thin high-definition displays for use in computers, word processors, etc. Active-matrix-type LCD devices are, among others, widely used because of their high performance. Further, among the active-matrix-type LCD devices, LCD devices using thin film transistors (hereinafter referred to as TFTS) as switching elements are particularly in great use, for properties thereof.

FIG. 17 conceptually illustrates an arrangement of an LCD device of prior art. In the conventional LCD device, first and second glass substrates are provided to face each other with a certain gap therebetween, in which a liquid crystal layer is held. The first glass substrate is provided with gate bus lines 101, source bus lines 102 which cross the gate bus lines 101, and TFTs 103 each disposed in the vicinity of each of intersections of the gate bus lines 101 and the source bus lines 102. Each TFT 103 is connected with a corresponding pixel electrode 104. On the other hand, the second glass substrate is provided with color filters (not shown) at positions corresponding to the pixel electrodes 104, and a counter electrode 105.

In such a conventional LCD device, however, since the gate bus lines and the source bus lines are provided on the same substrate though being separated by an insulating film provided therebetween, defects such as breaking of bus lines at intersections of bus lines where one climbs over another, and short-circuiting of bus lines due to defects of the insulating film occur, resulting in poor yield in manufacture.

As solution of the foregoing problems, therefore, an arrangement wherein the gate bus lines are formed on the first glass substrate while the source bus lines are formed on the second glass substrate (hereinafter referred to as counter source structure) has been proposed by the following references (a) through (c), for example.

(a) "New Electrodes Architectures for Liquid Crystal Displays Based on Thin Film Transistors," J. F. Clerc et al., Japan Display '86.

(b) "A New Active Matrix LCD Architecture for Larger Size Flat Display" Kenichi Oki et al., ITEJ Technical Report Vol.11 No.27, pp.73–78.

(c) The Japanese Publication for Laid-Open Patent Application No.133478/1987 (Tokukaisho 62-133478, date of publication: Jun. 16, 1987).

In an LCD device of the counter source structure, a first glass substrate is provided with gate bus lines, reference signal lines for applying a reference voltage to a liquid crystal layer, pixel electrodes, and TFTs, while a second glass substrate is provided with source bus lines. The first and second glass substrates are arranged so as to face each other with a certain gap therebetween, in which liquid crystal material is held. With the counter source structure, since the gate bus lines and the source bus lines thus do not intersect on one and same substrate, the lowering of yield in manufacture can be suppressed.

In order that color displaying be performed by an LCD device, it is necessary to arrange, on the second glass substrate, filters selectively transmitting waves with specific wavelengths. Besides, to enhance the display performance, in the normally white mode of an LCD using twist nematic liquid crystal material, for example, the white display (when no electric field is applied) has transmissivity greatly different from that of the black display (when an electric field is applied), or to state differently, a higher contrast ratio has to be obtained. Accordingly, a light blocking film for preventing light leakage is formed on the second glass substrate. As the light blocking film, a black matrix made of metal material such as chromium (Cr) has conventionally been formed.

FIGS. 18(a) through 18(d) are plan views and cross-sectional views illustrating an example of a manufacturing process of the second glass substrate. First, Cr is deposited on a glass substrate 111 by sputtering, which is followed by predetermined patterning through photolithography, etching, and resist-removing washing steps. As a result, a black matrix 112 is formed (see FIG. 18(a)).

Subsequently, a resin film (dry film) in which red pigment is dispersed is laminated thereon (the surface is coated with the resin film), then subjected to exposure, development, and baking, resulting in that a red (R) pattern 113 is formed. Further, a resin film in which green pigment is dispersed is laminated thereon, and a green (G) pattern 114 is formed in an identical manner to that for the red (R) pattern 113. Further, the blue (B) pattern 115 is formed in an identical manner to those for the red (R) pattern 113 and the green (G) pattern 114. Thus, three color layers are formed (see FIG. 18(b)). Incidentally, the same color filter formation process as that described above has been applied to the conventional LCD devices in which gate bus lines and source bus lines are both formed on the first glass substrate, as well as to the LCD devices of the counter source structure in which gate bus lines are formed on the first glass substrate while source bus lines are formed on the second glass substrate.

Next, a resin material is applied by spin coating over an entire surface of the glass substrate 111 on which the color filters are formed, and is subjected to baking, so that a transparent resin film (overcoat) 116 is formed (see FIG. 18(c)).

Then, an ITO film (indium tin oxide) is formed by sputtering, followed by predetermined patterning through photolithography, etching, and resist-removing washing steps. As a result, source bus lines 117 are formed (see FIG. 18(d))

In the LCD device of the counter source structure, however, gate signal input terminals and source signal input terminals are formed on respective different substrates. Besides, in the case of the counter source structure, a wire material of gate bus lines and that of source bus lines are generally different from each other. Since the gate bus lines and the source bus lines differ in film composition, the gate signal input side and the source signal input side differ in film thickness; This results in that a sealing member to be placed between the substrates for making the substrates adhere to each other and holding a liquid crystal material between the substrates is provided between surfaces with projections and recesses which are different on the gate signal input side and the source signal input side. Further, as thickness of the film on the substrate varies from the signal input side to the signal non-input side, it is difficult to keep the gap between the substrates uniform all along the four edges at-which the sealing material is applied, thereby causing a drawback in that the cell thickness of the liquid crystal panel becomes non-uniform.

Thus, the non-uniformity of cell thickness of the liquid crystal panel caused by projections and recesses due to the bus lines is remarkable particularly in the case of an LCD device of the counter source structure.

Generally, for an LCD device, to keep the distance between the two substrates uniform is important with view to good display performance, and this is more remarkable as the LCD device has a greater screen size.

SUMMARY OF THE INVENTION

The object of the present invention is to provide a liquid crystal display device which exhibits good display performance, by keeping cell thickness of a liquid crystal panel therein.

To achieve the foregoing object, a liquid crystal display device of the present invention is characterized by comprising (1) a first substrate having a plurality of gate bus lines, and a plurality of reference signal lines provided parallel with the gate bus lines, (2) a second substrate having a plurality of source bus lines provided so as to cross the gate bus lines, the second substrate facing the first substrate with a predetermined gap therebetween, (3) a sealing member for making the first and second substrates adhere to each other, and (4) a peripheral metal film formed through the same step through which the gate bus lines are formed, the peripheral metal film being positioned along three side edges of the first substrate, the three side edges being the side edges of the first substrate other than one side edge thereof on a gate signal input side, and is characterized in that parts of the sealing member along the foregoing three side edges fall on the peripheral metal film.

According to the foregoing arrangement, the peripheral metal film provided along the three side edges of the first substrate which are the side edges of the first substrate except one side edge on the gate signal input side are formed through the same step through which the gate bus lines are formed. Therefore, the peripheral metal film and the gate bus lines are composed of the same metal film, thereby resulting in that the sealing member formed on the peripheral metal film falls on top of metal films with substantially the same height on the first substrate.

Besides, the provision of the sealing member on the peripheral metal film makes it possible to keep the gap between the substrates substantially uniform, with substantially no change in the gap from the gate signal input side to the source signal input side.

This makes it possible to keep the gap between the first substrate and the second substrate substantially uniform in the vicinity of areas where the sealing member is applied, minimizing change in the cell thickness of the liquid crystal panel, thereby resulting in that good display performance can be achieved.

Furthermore, to achieve the foregoing object, a liquid crystal display device of the present invention may also be arranged so as to comprise (1) a first substrate having a plurality of gate bus lines, and a plurality of reference signal lines provided parallel with the gate bus lines, (2) a second substrate having a plurality of source bus lines provided so as to cross the gate bus lines, the second substrate facing the first substrate with a predetermined gap therebetween, (3) a sealing member for making the first and second substrates adhere to each other, and (4) a plurality of island-like metal films provided between the gate bus lines, on a gate signal input side of the first substrate, through the same step through which the gate bus lines are formed, and may be arranged so that parts of the sealing member formed on the gate signal input side of the first substrate fall on the land-like metal films.

According to the foregoing arrangement, the island-like metal films are formed between the gate bus lines, on a gate signal input side of the first substrate, through the same step through which the gate bus lines are formed. Therefore, the island-like metal films and the gate bus lines are composed of the same metal film, thereby resulting in that the sealing member formed on the island-like metal films falls on top of metal films having substantially no difference in height, on the gate signal input side of the first substrate.

This makes it possible to provide the sealing member under good conditions on the gate signal input side, to keep the gap between the first and second substrates substantially uniform, thereby ensuring good states of the liquid crystal panel in terms of the cell thickness, which leads to good display performance. Furthermore, by adapting material with a light blocking property so as to form the island-like metal films, the light blocking property on the gate signal input side can be enhanced.

For a fuller understanding of the nature and advantages of the invention, reference should be made to the ensuing detailed description taken in conjunction with the accompanying drawings.

DESCRIPTION OF THE PREFERRED EMBODIMENTS

[First Embodiment]

The following description will explain an embodiment of the present invention while referring to FIGS. 1 through 13, 15, and 16.

Figure 1:
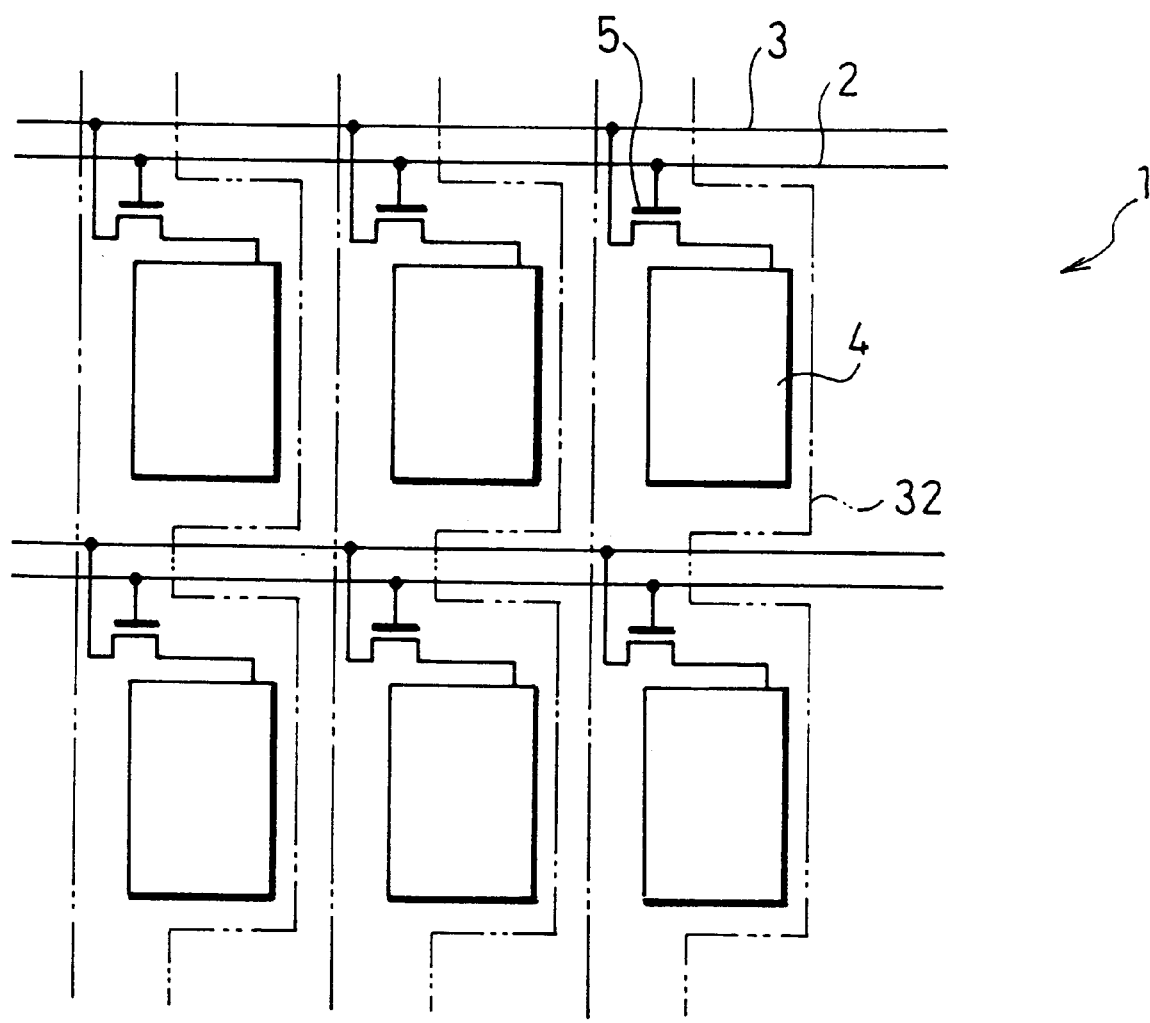
FIG. 1 is an explanatory view conceptually illustrating an LCD device of the counter source structure, in accordance with a first embodiment of the present invention.
Figure 2:
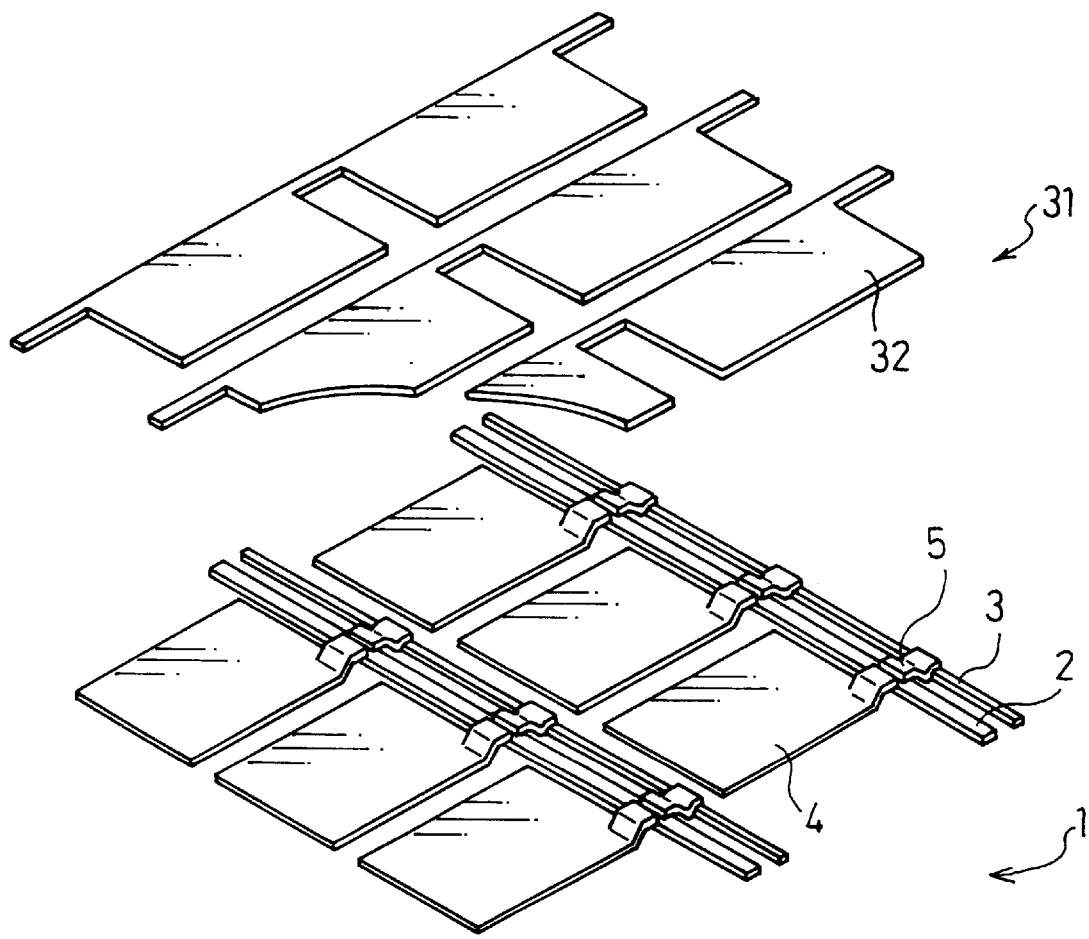
FIG. 2 is a perspective view conceptually illustrating the counter source structure.

An LCD device in accordance with the present embodiment is an LCD device of the counter source structure wherein gate bus lines are provided on a pixel substrate (first substrate) while source bus lines are provided on a counter substrate (second substrate). FIG. 1 is an explanatory view conceptually illustrating an LCD device of the counter source structure in accordance with the present embodiment, and FIG. 2 is a perspective view illustrating the counter source structure. This LCD device of the counter source structure will be explained with reference to FIGS. 1 and 2.

The LCD device of the counter source structure in accordance with the present embodiment has the following structure, as shown in FIG. 1: gate bus lines 2 and reference signal lines 3 for imparting a reference potential to a liquid crystal layer are arranged in parallel, and further, pixel electrodes 4 for applying voltages to the liquid crystal layer and TFTs (thin film transistors) 5 as switching elements for driving the pixel electrodes 4 are formed in matrix. The TFTs 5 are connected with the foregoing pixel electrodes 4.

Gate electrodes of the TFTs 5 on a certain same row are all connected to one corresponding gate bus line 2, while drain electrodes of the TFTs 5 on the row are connected to one corresponding reference signal line 3. Source electrodes of the TFTs 5 are connected to respective corresponding pixel electrodes 4.

The source bus lines 32 formed on the counter substrate 31 are arranged, as shown in FIG. 2, so as to cross the gate bus lines 2 and the reference signal lines 3 provided on the pixel substrate 1. Each source bus line 32 is formed so that portions thereof facing the pixel electrodes 4 are wider than the other portions thereof, for agreement of the source bus line 32 with the pixels 4 in shape.

The pixel substrate 1 and the counter substrate 31 are arranged so as to face each other at a uniform distance, as shown in FIG. 2, and liquid crystal material is held between the substrate, which are made to adhere to each other by means of a sealing member.

In the LCD device of the counter source structure as described above, the gate bus lines 2 and the source bus lines 32 do not intersect on one and same substrate, thereby resulting in that the lowering of the yield in manufacture can be suppressed. Furthermore, the foregoing courter source structure is a structure less prone to signal delay, since having less capacity coupling which may affect the gate bus lines 2 and the source bus lines 32.

Figure 3:
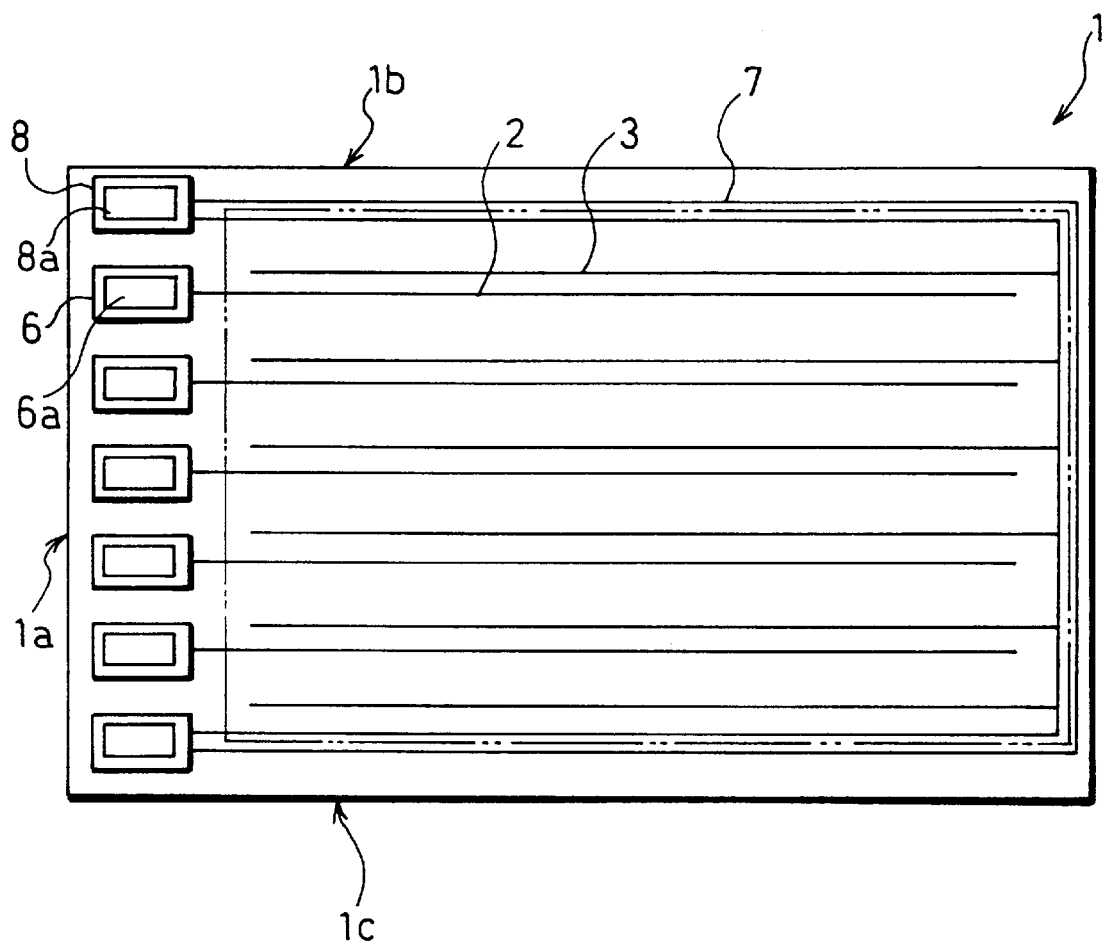
FIG. 3 is a plan view conceptually illustrating an arrangement of a pixel substrate in the foregoing liquid crystal display device.

The following description will explain a structure of the pixel substrate 1 of the LCD device in accordance with the present embodiment. FIG. 3 is an explanatory view schematically illustrating a structure of the pixel substrate 1 of the foregoing LCD device. As shown in FIG. 3, the pixel substrate 1 is provided with the gate bus lines 2, the reference signal lines 3, gate signal input terminals 6, and a reference signal trunk line (peripheral metal film) 7 as a trunk of the reference signal lines formed through the same step through which the gate bus lines 2 are formed, and reference signal input terminals 8.

The foregoing gate signal input terminals 6, equal in number to the gate bus lines 2, are disposed along a left side edge 1a of the pixel substrate 1, i.e., an edge thereof on the gate signal input side, and each is connected to an end of one corresponding gate bus line 2 so that a gate signal is supplied to the gate bus line 2. A contact hole 6a is formed in the center of each gate signal input terminal 6.

The reference signal trunk line 7 is provided outside a display area, along all the side edges of the pixel substrate 1 except the left side edge 1a on the gate signal input side, i.e., along the other three side edges. Further, the foregoing reference signal trunk line 7 is connected with all the reference signal lines 3 so that a reference signal is supplied to all the reference signal lines 3. The reference signal input terminals 8 for supplying a reference signal from outside to the reference signal trunk line 7 are disposed at substantially the same column with the gate signal input terminal, one on the upper edge 1b of the pixel substrate 1 side, and one on the lower edge 1c of the pixel substrate 1 side, so that the gate signal input terminals 6 are positioned between the reference signal input terminals 8. A contact hole 8a is formed in the center of each reference signal input terminal 8.

Incidentally, the respective numbers of the gate signal input terminals 6 and the reference signal input terminals 8 are mere examples, and the present invention need not be limited to the foregoing.

The sealing member for making the pixel substrate 1 adhere to the counter substrate 31 is disposed on top of the reference signal trunk line 7, as indicated by a two-dot chain line in the figure. Thus, by providing the sealing member on top of the reference signal trunk line 7 which is formed through the same step through which the gate bus lines 2 are formed, substantially the same film composition is obtained at the sealing member provision position on the pixel substrate 1, resulting in that the sealing member is by no means provided on projections differing in height. Consequently, the gap between the pixel substrate 1 and the counter substrate 31 can be maintained substantially uniform, and non-uniformity of the cell thickness of the liquid crystal panel which greatly affects the display performance of an LCD device can be suppressed to substantially minimum, thereby ensuring good display performance.

The following description will explain steps for manufacturing the pixel substrate 1, while referring to FIGS. 4(a) through 4(e). FIGS. 4(a) through 4(e) are cross-sectional views and plane views of a region of the foregoing pixel substrate 1 corresponding to one pixel, for illustration of manufacturing steps.

Figure 4A:
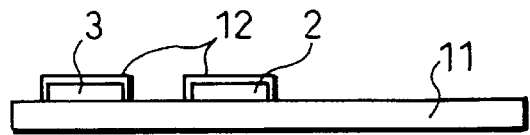
FIGS. 4(a) through 4(e) are cross-sectional views and plan views illustrating steps for manufacturing the foregoing pixel substrate regarding a region corresponding to one pixel.
Figure 4A:
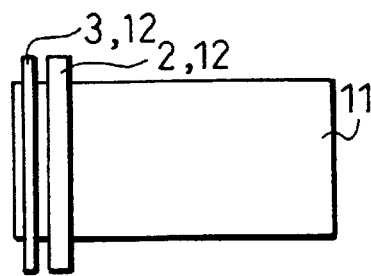

As shown in FIG. 4(a), the gate bus line 2 and the reference signal line 3 are formed parallel to each other on the glass substrate 11, and are covered with an anode oxide film 12.

To explain detailed steps, a film is formed with metal material, tantalum (Ta) in this case, on a 0.7 mm-thick glass substrate 11 by sputtering. Here, a tantalum nitride (TaN)

film is formed between the glass substrate 11 and the Ta film. The TaN film improves adhesion of the Ta film to the glass substrate 11, while makes the Ta film have a lower resistance. Incidentally, the TaN film and the Ta film are formed without breaking vacuum, i.e., formed in the same vacuum.

Furthermore, a TaN film is formed on the foregoing Ta film. In other words, a trilaminar continuous film of TaN/Ta/TaN is formed on the glass substrate 11. In the present embodiment, the layers of the TaN/Ta/TaN film are, from below, 60 nm, 260 nm, and 80 nm in thickness, respectively. The drawings however show the three layers as one film to avoid complexity.

The foregoing TaN/Ta/TaN trilaminar continuous film is patterned into a predetermined pattern through common photolithography, etching, and resist-removing washing steps, etc., whereby the gate bus line 2 and the reference signal line 3 are formed parallel to each other.

Furthermore, by anodization with a transformation voltage of 80V by using as anode the gate bus line 2 and the reference signal line 3 composed of the TaN/Ta/TaN trilaminar continuous film thus patterned, the gate bus line 2 and the reference signal line 3 become coated with the anode oxide film 12. As described above, the object of formation of the TaN film over the Ta film is to raise an insulation resistance of tantalum oxide (TaOx) as the anode oxide film 12 obtained by anodization, by adding nitrogen (N) to Ta.

Figure 4B:
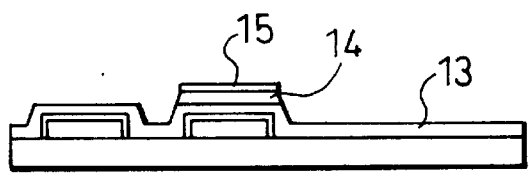
Figure 4B:
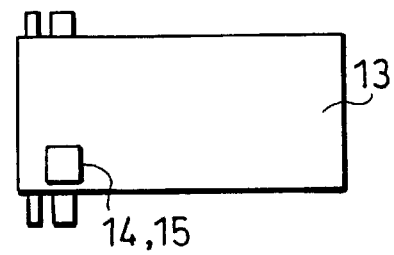

Next, as shown in FIG. 4(b), a gate insulating layer 13 is formed on the glass substrate 11 on which the gate bus line 2 and the reference signal line 3 are thus formed. Further, on a part of the gate insulating layer 13 on the gate bus line 2 where the TFT 5 as switching element is to be formed, a semiconductor layer 14 and an n-type semiconductor layer 15 are formed in this order.

More specifically, first, an insulating film, a semiconductor film, and a high-impurity-doped n-type semiconductor film are laminated in this order on the glass substrate 11 on which the gate bus line 2 and the reference signal line 3 coated with the anode oxide film 12 have been formed. Their thicknesses in the present embodiment are, from below, 340 nm, 160 nm, and 50 nm, respectively.

This is followed by patterning of the semiconductor film/n-type semiconductor film through photolithography, etching, and resist-removing washing steps. As a result, a gate insulating layer 13 is formed on the glass substrate 11 provided with the gate bus line 2 and the reference signal line 3, and further, the semiconductor layer 14 and the n-type semiconductor layer 15 are formed in this order on the part of the gate insulating layer 13 above the gate bus line 2 at which the TFT 5 is provided.

Figure 4C:
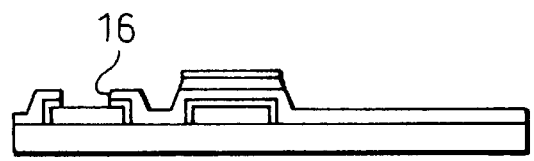
Figure 4C:
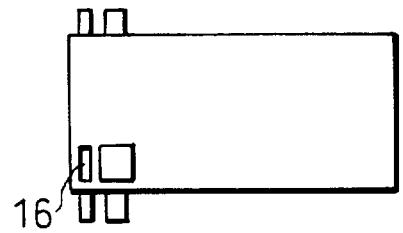

Next, as shown in FIG. 4(c), a contact hole 16 is formed on the reference signal line 3, for formation of the drain electrode of the TFT 5.

More specifically, the patterning of the anode oxide film 12 and the gate insulating layer 13 on the reference signal 3 is carried out through photolithography, etching, and resist-removing washing steps, etc., to form a contact hole 16 on the reference signal line 3.

Figure 4D:
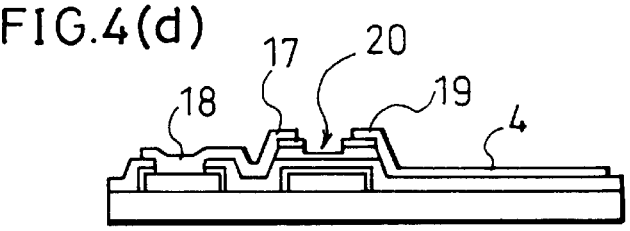
Figure 4D:
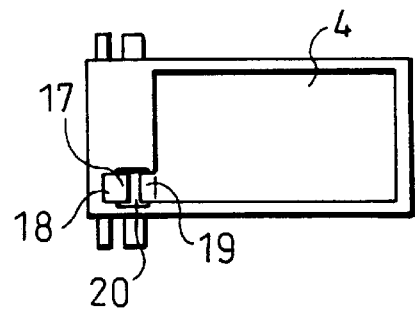

Subsequently, as shown in FIG. 4(d), a drain electrode 17 of the TFT 5, and a drain electrode leader section 18 to be connected with the reference signal line 3 through the contact hole 16 are formed in single-film form, on the reference signal line 3 side with respect to the gate bus line 2. On the other hand, the source electrode 19 of the TFT 5 and the pixel electrode 4 are formed in single-film form on the opposite side to the reference signal line 3 side with respect to the gate bus line 2. Further, a channel section 20 of the TFT 5 is formed above the gate bus line 2.

More specifically, a 140 nm-thick ITO (indium tin oxide) film is formed, and is patterned through photolithography, etching, resist-removing washing steps, etc., so that the ITO film is removed exclusively from above the gate bus line 2. As a result, the drain electrode 17 of the TFT 5 and the drain electrode leader section 18 to be connected with the reference signal line 3 through the contact hole 16 are formed with a single ITO film on the reference signal line 3 side with respect to the gate bus line 2. On the other hand, the source electrode 19 of the TFT 5 and the pixel electrode 4 are formed with a single. ITO film.

Further, as the foregoing drain electrode 17, drain electrode leader section 18, source electrode 19, and pixel electrode 4 serve as a mask, an upper surface part of the semiconductor layer 14 and the n-type semiconductor layer 15 which have previously been processed are removed exclusively from above the gate bus line 2, resulting in that the channel section 20 of the TFT 5 is formed above the gate bus line 2.

Figure 4E:
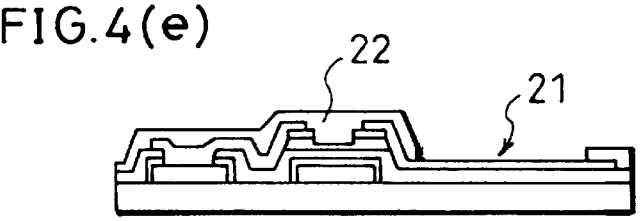
Figure 4E:
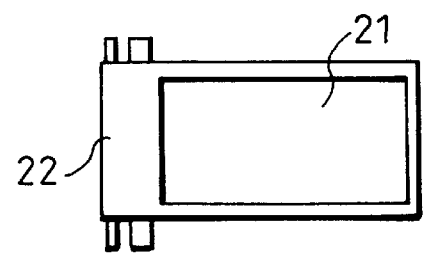

Finally as shown in FIG. 4(e), a protective film 22 is formed all over the surface except above the pixel electrode 4, so that a pixel electrode opening section 21 is formed on the pixel electrode 4.

More specifically, a 200 nm-thick silicon nitride (SiNx) film is formed, followed by patterning through photolithography, etching, resist-removing washing steps, etc. so that the SiNx film is removed exclusively from above the pixel electrode 4, where the pixel electrode opening section 21 is formed. The SiNx film covering the whole surface except the opening section 21 serves as the protective film 22.

Through the steps described above, the pattern structure inside a display area (a region corresponding to the display area of the liquid crystal panel to be formed later) on the pixel substrate 1 is completed.

Figure 5A:
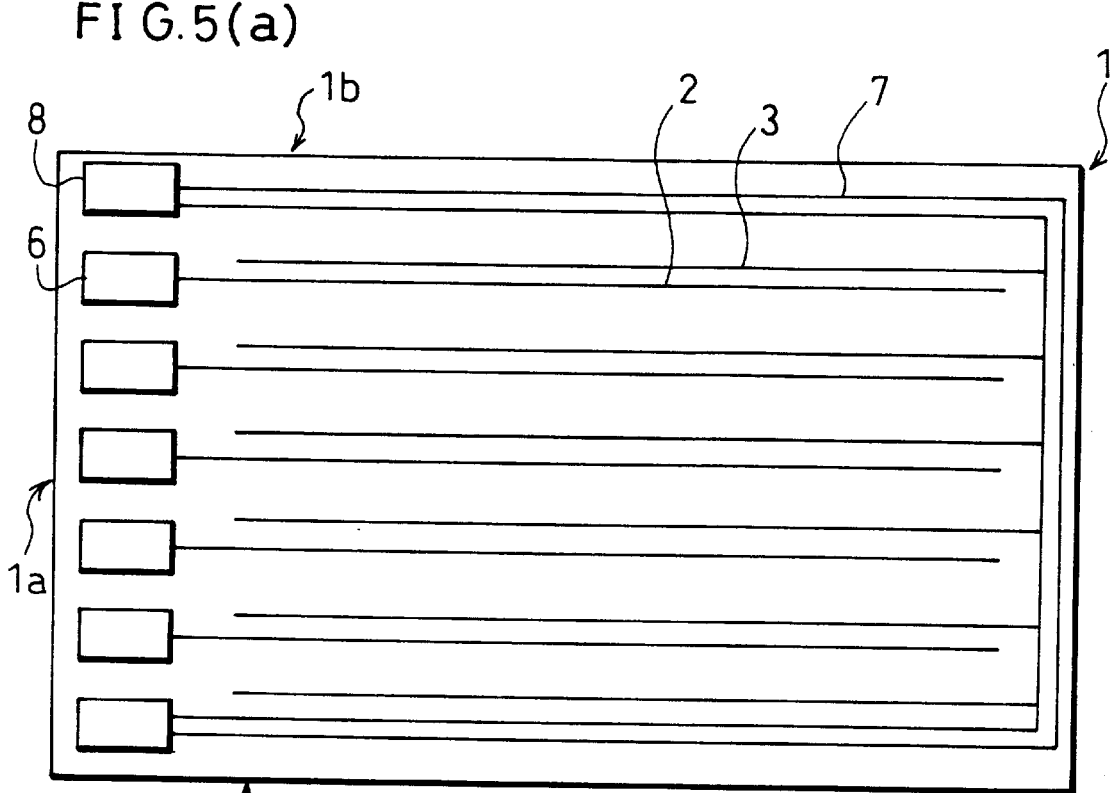
FIGS. 5(a) and 5(b) are plan views illustrating steps for manufacturing the foregoing pixel substrate.
Figure 5B:
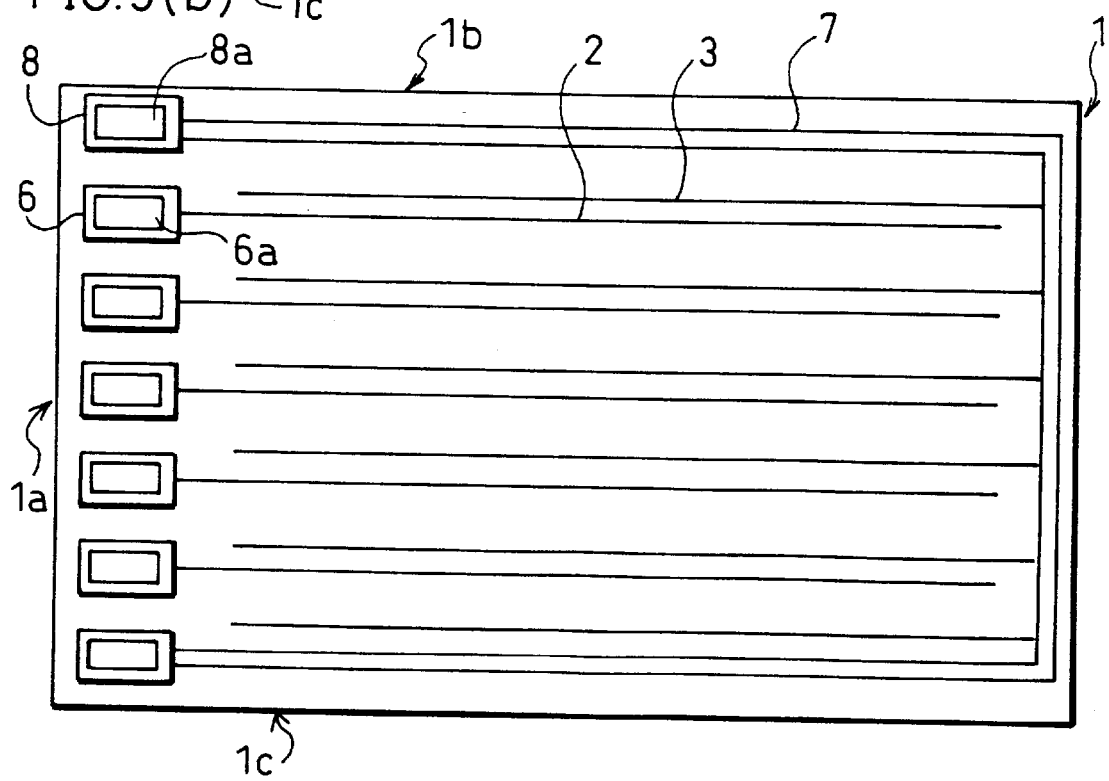
Figure 6:
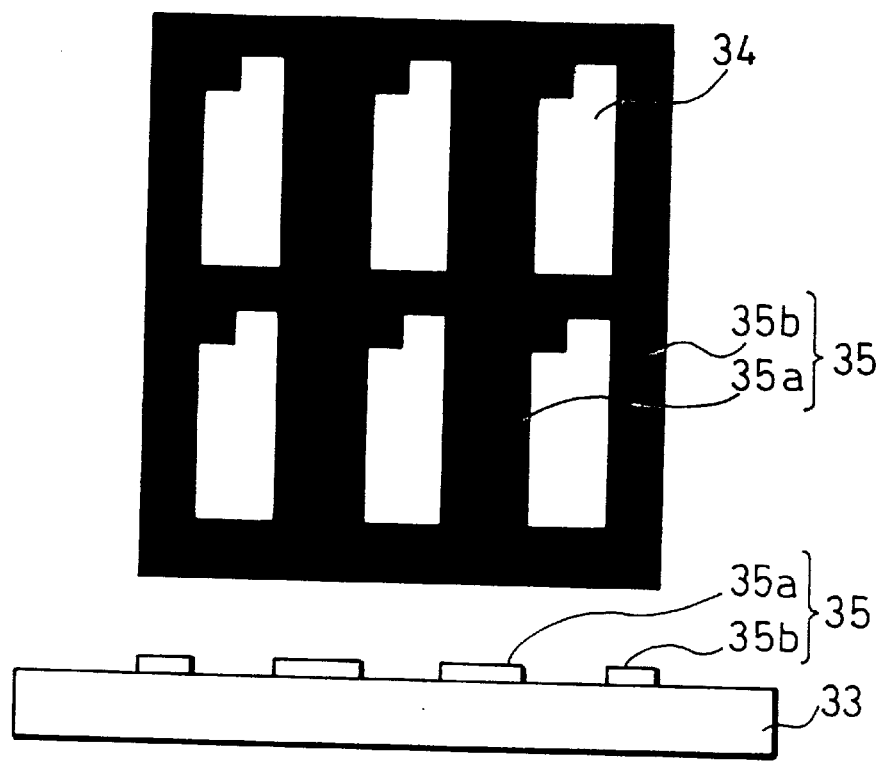
FIGS. 6(a) and 6(b) are cross-sectional view and plan views illustrating steps for forming color filters on a counter substrate of the foregoing LCD device.
Figure 6:
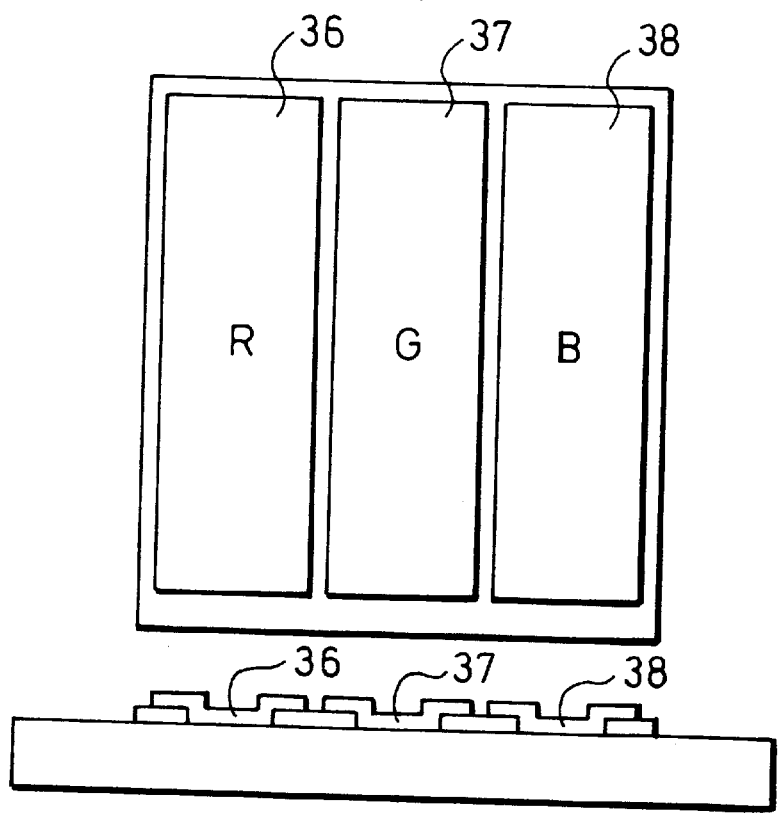

The following description will explain the steps for forming the gate signal input terminal 6, the reference signal trunk line 7, and the reference signal input terminal 8 on the pixel substrate 1, while referring to FIGS. 5(a) and 5(b).

When the gate bus lines 2 and the reference signal lines 3 are formed as shown in FIG. 4(a), the gate signal input terminals 6, the reference signal input terminals 8, and the reference signal trunk line 7 are formed.

As shown in FIG. 5(a), in the present embodiment, the same number of gate signal input terminals 6 as the number of the gate bus lines 2 are formed along a left side edge 1a, i.e., on the gate signal input side of the pixel substrate 1, through the same step through which the gate bus lines 2 are formed. Each gate signal input terminal 6 is connected with an end of each gate bus line 2.

Further, the reference signal trunk line 7 and the reference signal input terminals 8 are formed through the same step through which the gate bus lines 2 are formed, so as to be connected with each other. One of the reference signal input terminals 8 is disposed on the upper edge 1b side of the pixel substrate 1 while the other is disposed on the lower edge 1c side thereof, so that the reference signal input terminals 8 fall substantially on the line on which the gate signal input terminals 6 are aligned, and that the gate signal input terminals 6 come between the reference signal input terminals 8. The reference signal trunk line 7 is formed outside a display area, along three edges of the pixel substrate 1 which are the edges of the pixel substrate 1 except the edge on the gate signal input terminals 6 side, i.e., the edges of the same except the left side edge 1a. Further, the foregoing reference signal trunk line 7 is connected with every reference signal line 3 which supplies a reference signal to the inside of the display area of the pixel substrate 1.

Next, through the step for forming the semiconductor layer 14 and the n-type semiconductor layer 15 as shown in FIG. 4(b), the semiconductor film and the n-type semiconductor film are removed exclusively from above the gate signal input terminals 6, the reference signal input terminals 8, and the reference signal trunk line 7 by etching.

Next, through the step for forming the contact hole 16 which is used for connection between the reference signal line 3 and the drain electrode leader section 18 as shown in FIG. 4(c), the insulating film and the anode oxide film are removed from above the reference signal trunk line 7. Further, a contact hole 6a of each gate signal input terminal 6 and a contact hole 8a of each reference signal input terminal 8 are formed as shown in FIG. 5(b).

Next, through the step for forming the drain electrode 17 as shown in FIG. 4(d), the drain electrode leader section 18, the source electrode 19, and the pixel electrode 4, an ITO film is formed on the contact holes 6a of the gate signal input terminals 6 and the contact holes 8a of the reference signal input terminals 8.

Next, through the protective film 22 forming step as shown in FIG. 4(e), the SiNx film is removed exclusively from above the contact holes 6a of the gate signal input terminals 6 and the contact holes 8a of the reference signal input terminals 8 by patterning.

Through the steps as described above, the pixel substrate 1 is completed.

Figure 7A:
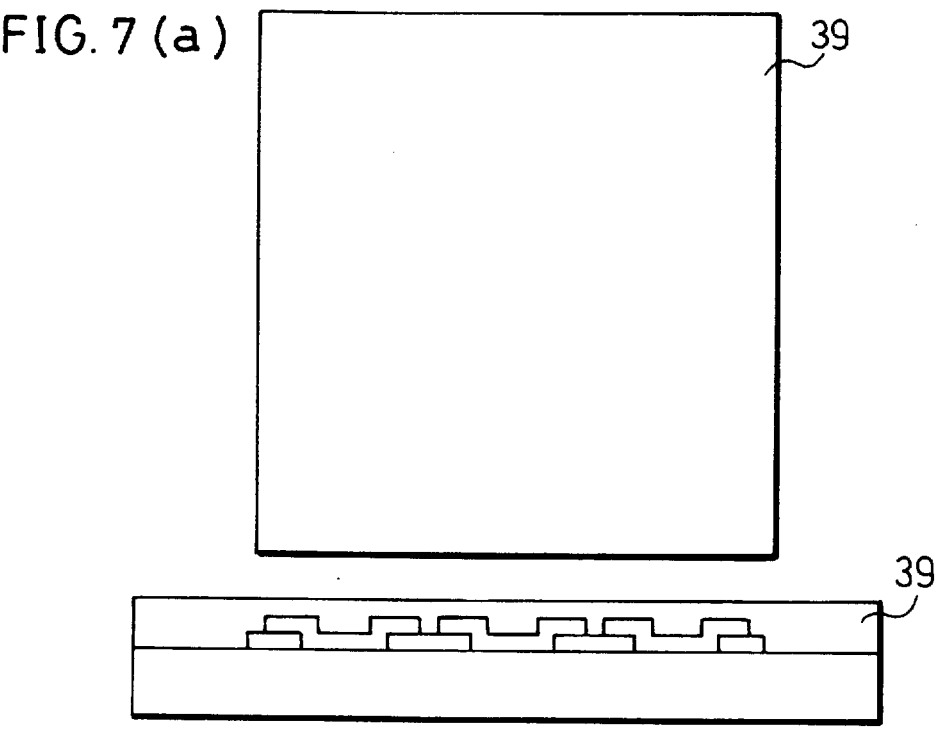
FIGS. 7(a) and 7(b) are cross sectional views and plan views illustrating steps for forming source bus lines on the counter substrate of the foregoing LCD device.
Figure 7B:
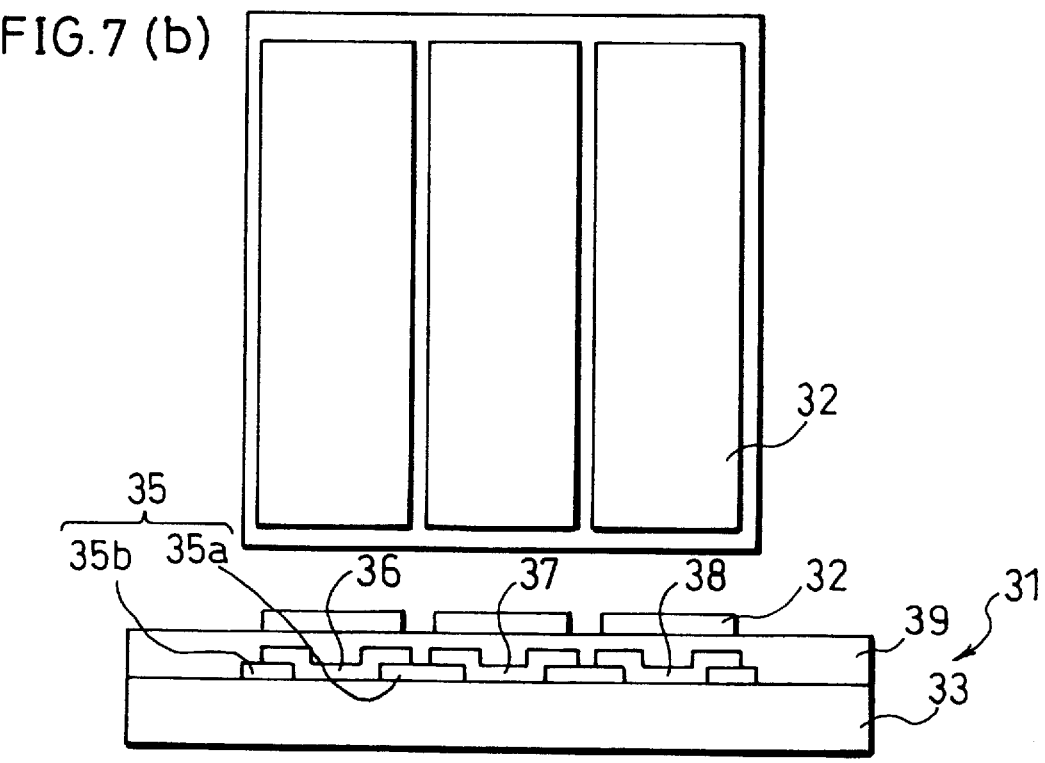

The following description will explain the structure of the counter substrate 31 of the LCD device in accordance with the present embodiment, while referring to FIG. 7(b). As shown in the cross-sectional view of FIG. 7(b), the counter substrate 31 of the present embodiment is formed as follows. A black matrix 35 having openings 34 (see FIG. 6(a)) is formed on a glass substrate 33, and red (R) patterns 36, green (G) patterns 37, and blue (B) patterns 38 are arrayed on the black matrix 35 so as to cover the openings 34. Further, the entire counter substrate 31 is coated with a overcoat 39 made of transparent resin. On the overcoat 39, the source bus lines 32 are provided.

The source bus lines 32 are connected with source signal input terminals (not shown) so that source signals from outside are supplied through the source signal input terminals to the source bus lines 32.

The black matrix 35 is a light blocking film for preventing areas not in use for display from transmitting light, so as to ensure contrast.

Figure 8:
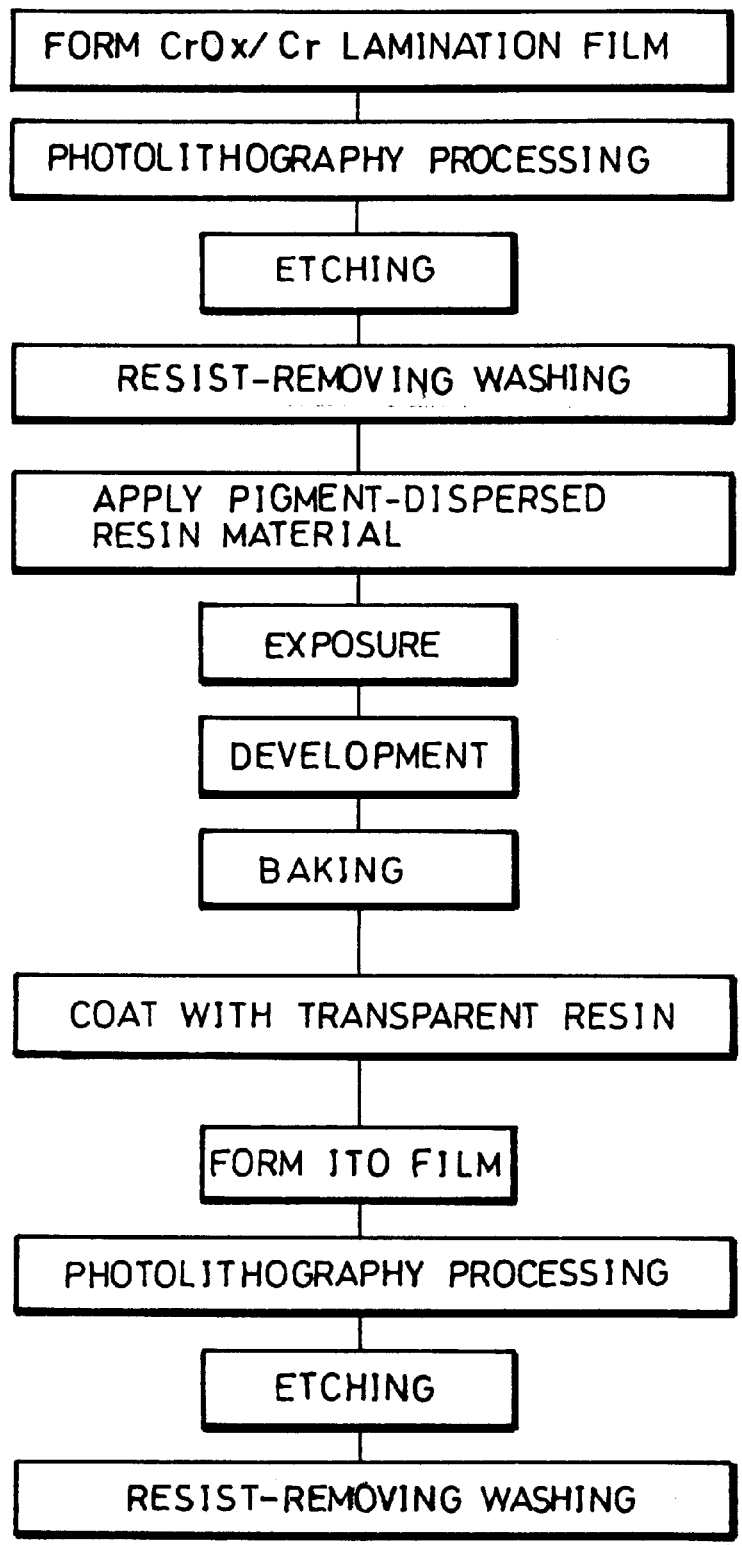
FIG. 8 is a flowchart of a manufacturing process of the counter substrate of the foregoing LCD device.

The following description will explain the steps for manufacturing the counter substrate 31, while referring to FIGS. 6(a), 6(b), 7(a), 7(b), and 8. FIGS. 6(a) and 6(b) are plan views and cross-sectional views showing steps for forming color filters on the counter substrate 31. FIGS. 7(a) and 7(b) are plan views and crosssectional views showing steps for forming the source bus lines 32 on the counter substrate 31. FIG. 8 is a flowchart of the manufacturing process of the counter substrate 31.

As shown in FIG. 6(a), a lamination film of chromium oxide (CrOx)/chromium (Cr) is formed on the glass substrate 33 by sputtering. Then, predetermined patterning is performed through photolithography, etching, and resist-removing washing steps, so that the black matrix 35 having openings 34 is formed. Taking reflection of external light on the completed liquid crystal panel into consideration, the interface between the glass substrate 33 and the black matrix 35 is preferably low-reflective. Therefore, in the present embodiment, a CrOx film is formed on the interface between the Cr film and the glass substrate 33, as described above.

The foregoing black matrix 35 is composed of a black matrix 35a as a light blocking film for preventing light leakage inside the display area of the liquid crystal panel, and a black matrix 35b as a frame outside the display area of the liquid crystal panel.

Then, as shown in FIG. 6(b), a resin film (dry film) in which red pigment is dispersed is laminated, and the red (R) patterns 36 are formed through exposure, development, and baking steps. Further, a resin film in which green pigment is dispersed is laminated thereon, and the green (G) patterns 37 are formed through the identical steps to those for the red (R) patterns 36. Further, the blue (B) patterns 38 are formed through the identical steps to those for the red (R) patterns 36 and the green (G) patterns 37. As the color layers in three colors are formed as described above, the openings 34 of the black matrix 35 are covered with the color films. This is the process of forming the color filters on the counter substrate 31.

Then, as shown in FIG. 7(a), resin material is applied to a thickness of 3 $\mu$m over the entire surface by spin coating, and is subjected to baking, so that the overcoat 39 as transparent resin film coating is formed.

Next, as shown in FIG. 7(b), a 1400 Å-thick ITO film is formed by sputtering, followed by patterning through photolithography, etching, and resist-removing washing steps, resulting in that the predetermined source bus lines 32 are formed. Through the foregoing steps, the source bus lines 32 are formed, whereby the counter substrate 31 is completed.

The liquid crystal panel of the present embodiment is formed as follows. Namely, the pixel substrate 1 and counter substrate 31 formed as described above are provided to face each other with a predetermined gap therebetween. The gap is filled with liquid crystal material, and the substrates are fixed to each other with a sealing member.

The foregoing sealing member is disposed on the reference signal trunk line 7 which is formed along all the side edges of the pixel substrate 1 except the left side edge 1a on the gate signal input side. Incidentally, the position of the sealing member is indicated by the two-dot chain line in FIG. 3.

Figure 15:
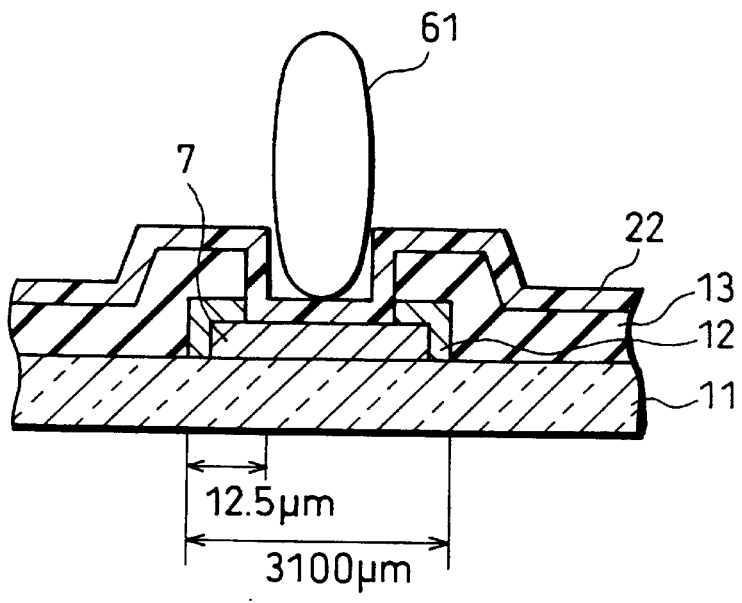
FIG. 15 is a cross-sectional view schematically illustrating a state of an LCD device in accordance with the first embodiment in which a sealing member is provided on a reference signal trunk line.

The provision of the sealing member on the reference signal trunk line 7 as described above allows the pixel substrate 1 to be arranged so that substantially the same film composition is obtained anywhere at the sealing member provision position where the sealing member is provided. In other words, the sealing member is provided at a position at which there are substantially no difference in height. Incidentally, a schematic view illustrating a state in which the sealing member is disposed on the reference signal trunk line 7 is shown in FIG. 15. As shown by the figure, the sealing member designated by 61 is placed, above the reference signal trunk line 7, on a part of the protective film 22 where the anode oxide film 12 and the gate insulating film 13 are absent. Besides, in the present embodiment, the reference signal trunk line 7 including the anode oxide film 12 has a width of about 3100 $\mu$m, while each edge part of the reference signal trunk line 7 outside the foregoing sealing member 61 provision area has a width of about 12.5 $\mu$m, as shown in the same figure.

With the foregoing arrangement, the gap between the pixel substrate 1 and the counter substrate 31 is kept uniform, and non-uniformity of the cell thickness of the LCD panel, which tends to greatly affect the display performance of the LCD device, can be minimized, ensuring that excellent display performance can be achieved.

Next, concrete steps for forming the liquid crystal panel will be explained. Polyimide films are applied as alignment films over surfaces of the pixel substrate 1 and the counter substrate 31, the surfaces being on the respective sides opposite to the sides in contact with the liquid crystal material. Further, resin material of a photo-hardening type is printed on the pixel substrate 1, to form the sealing member for fixing the pixel substrate 1 to the counter substrate 31, and thereafter, the pixel substrate 1 and the counter substrate 31 are provided to face each other, between which liquid crystal material is injected.

Further, upon the liquid crystal panel formation, spherical plastic beads are spread over the display area of the liquid crystal panel and the sealing member, to keep the uniform cell thickness of the liquid crystal panel. By adjusting the particle diameter of the plastic beads, the uniformity of the cell thickness of the liquid crystal panel is improved, thereby enhancing the display performance.

In the present embodiment, plastic beads with a diameter of 4.5 $\mu$m are spread over the display area of the liquid crystal panel, while plastic beads with a diameter of 5 $\mu$m are dispersed in the sealing material and this sealing material is printed on the reference signal trunk line 7 of the pixel substrate 1 as described above.

Generally, the cell thickness (gap between the upper and lower substrates) ensured by the bead-form spacers in the sealing material as described above is determined to the thickness at a position at which the gap between the substrates when being made to adhere to each other becomes narrowest, in the case where areas of the lines formed on the glass substrates and areas the spaces between the lines are substantially equal.

Figure 16A:
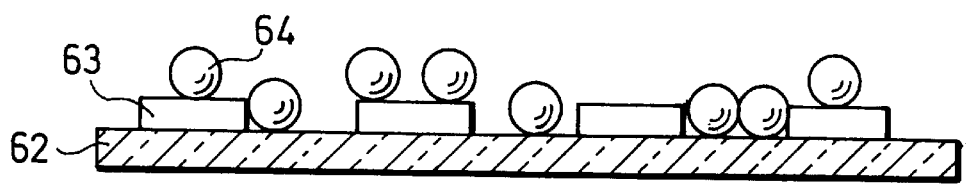
FIG. 16(a) is a cross-sectional view illustrating a state in which bead-like spacers are spread on one substrate having projections and recesses thereon.
Figure 16B:
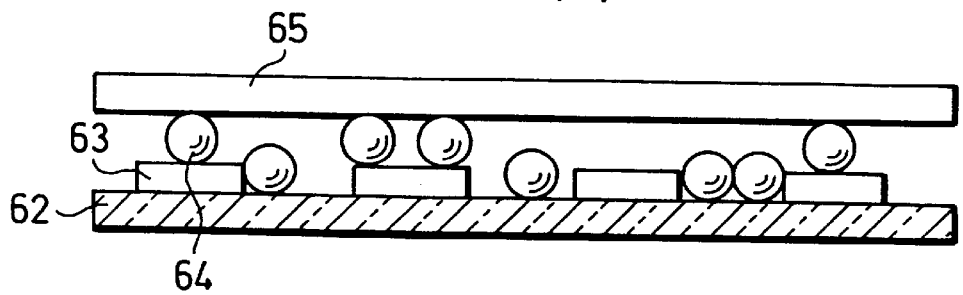
FIG. 16(b) is a cross-sectional view illustrating a state in which the substrate shown in FIG. 16(a) is made to adhere to the other substrate.
Figure 17:
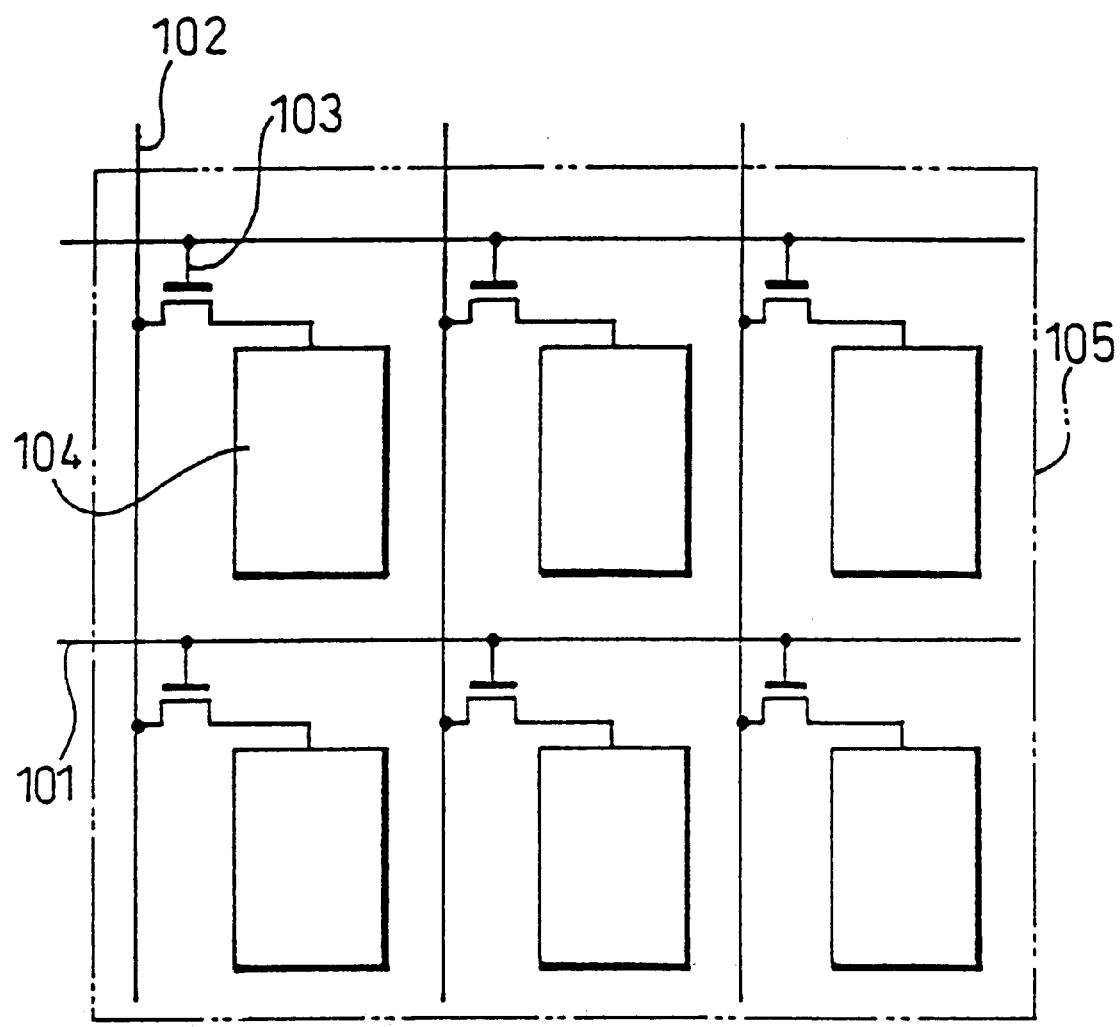
FIG. 17 is an explanatory view conceptually illustrating an arrangement of an LCD device of prior art.
Figure 18A:
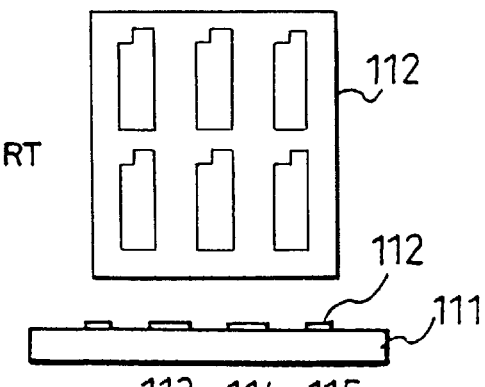
FIGS. 18(a) through 18(d) are cross-sectional views and plan views illustrating steps for manufacturing a counter substrate of an LCD device of the counter source structure.
Figure 18B:
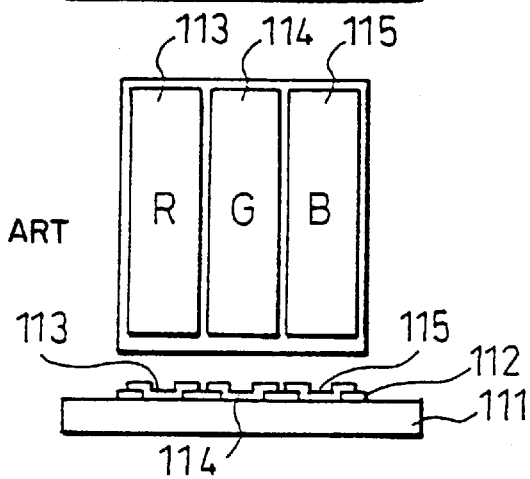
Figure 18C:
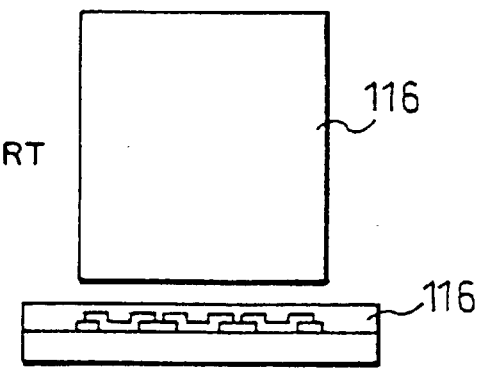
Figure 18D:
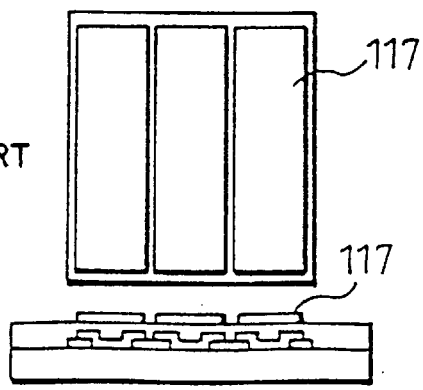

For example, FIG. 16(a) illustrates a state in which bead-like spacers 64 are spread over one glass substrate 62 whose surface is uneven since being provided with a plurality of lines 63, and FIG. 16(b) illustrates a state in which the other substrate 65 is made to adhere to the substrate 63. As shown in FIG. 16(b), the cell thickness is determined by the spacers 64 placed at a higher position, that is, on the line 63. This state is equivalent to the state where the sealing material is printed on a rough surface having projections and recesses, such as gate signal input terminals of the LCD device.

Figure 9:
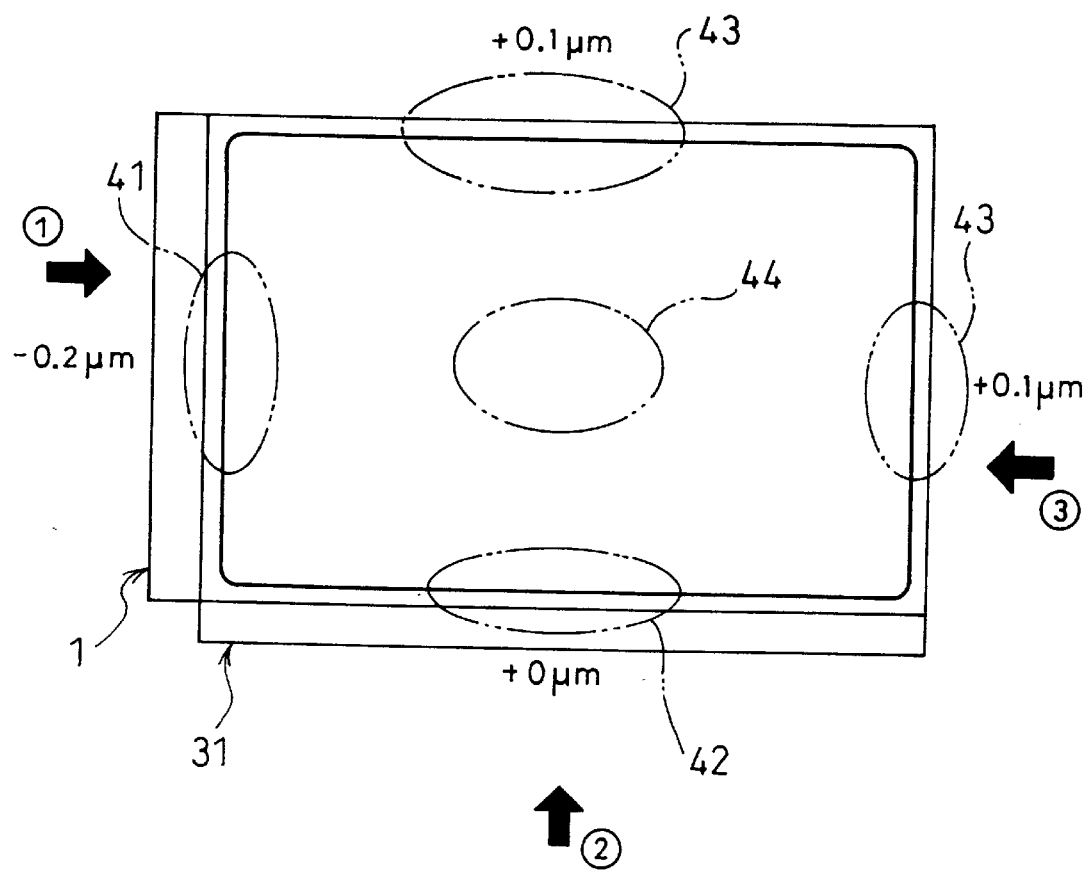
FIG. 9 is a plan view illustrating a liquid crystal panel in accordance with the first embodiment of crystal panel in accordance with the first embodiment of the present invention.
Figure 10:
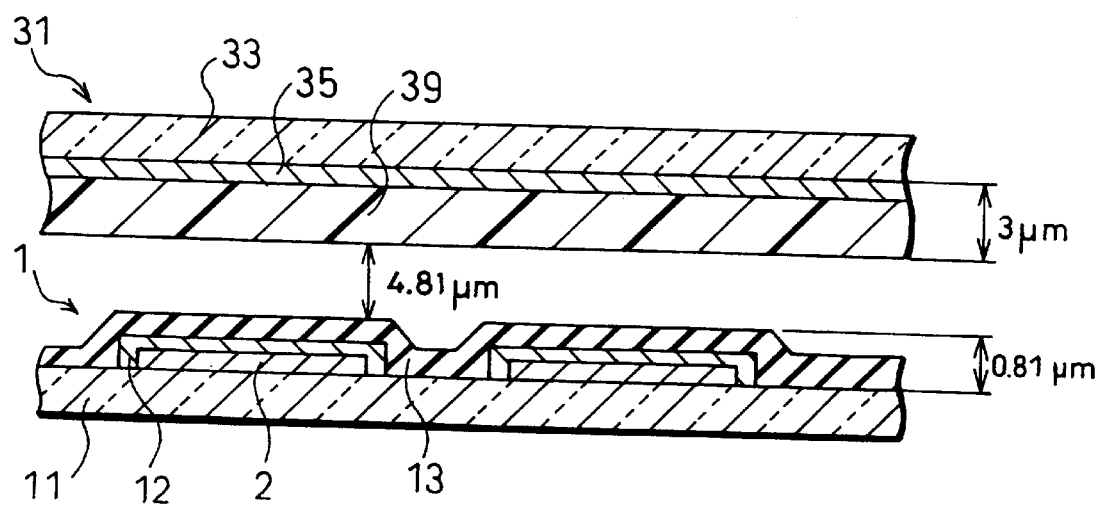
FIG. 10 is a cross-sectional view of a gate signal input side part of the foregoing liquid crystal panel.

The following description will explain the cell thickness of the liquid crystal panel of the present embodiment formed as described above, while referring to FIGS. 9 through 13. FIG. 9 is a plan view of a liquid crystal panel formed by providing the pixel substrate 1 and the counter substrate 31 so as to face each other. FIG. 10 is a cross-sectional view of the liquid crystal panel of FIG. 9 viewed in a thick arrow $\hat{1}$ direction (a cross-sectional view of a gate signal input side part 41 of the liquid crystal panel), FIG. 11 is a cross-sectional view of the liquid crystal panel of FIG. 9 viewed in a thick arrow $\hat{2}$ direction (a cross-sectional view of a source signal input side part 42 of the liquid crystal panel), FIG. 12 is a cross sectional view of one of signal non-input side parts 43 shown in FIG. 9 viewed in a thick arrow $\hat{3}$ direction, and FIG. 13 is a cross-sectional view of a part 44 in the display area of the liquid crystal panel shown in FIG. 9.

As shown in FIG. 10 which is the cross-sectional view of the liquid crystal panel of FIG. 9 viewed in the arrow $\hat{1}$ direction, a film formed on the glass substrate 11 of the pixel substrate 1 has a thickness of 0.81 $\mu$m at the gate signal input side part 41 of the liquid crystal panel, while a film formed on the glass substrate 33 of the counter substrate 31 has a thickness of 3 $\mu$m at the same part. Further, the cell thickness of the liquid crystal panel is 4.81 $\mu$m at the same part.

Figure 11:
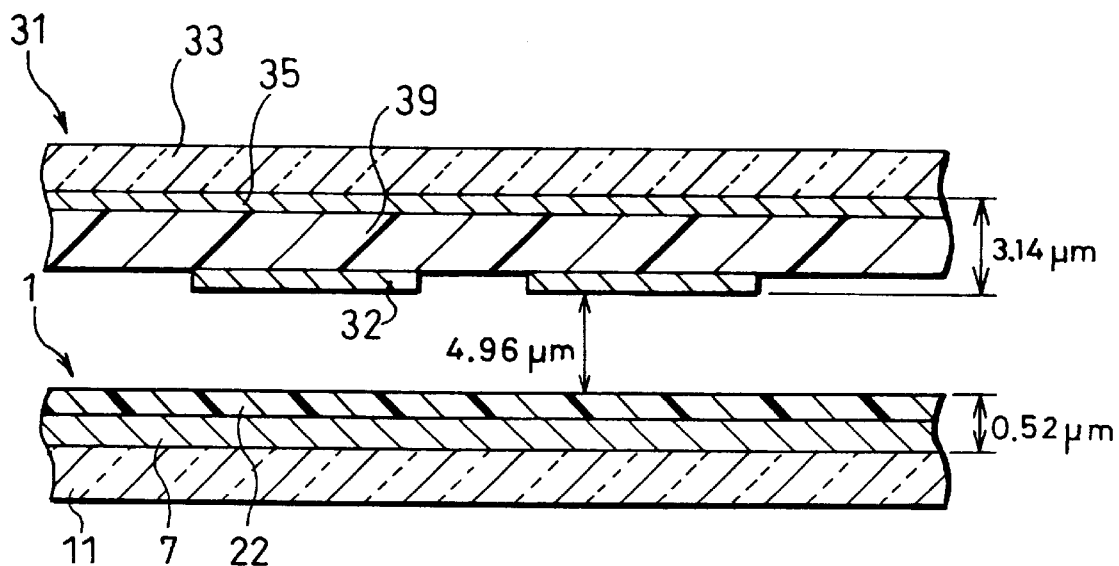
FIG. 11 is a cross-sectional view of a source signal input side part of the foregoing liquid crystal panel.

As shown in FIG. 11 which is the cross-sectional view of the liquid crystal panel of FIG. 9 viewed in the arrow $\hat{2}$ direction, a film formed on the glass substrate 11 of the pixel substrate 1 has a thickness of 0.52 $\mu$m at the source signal input side part 42 of the liquid crystal panel, while the film formed on the glass substrate 33 of the counter substrate 31 has a thickness of 3.14 $\mu$m at the same part. Further, the cell thickness of the liquid crystal panel is 4.96 $\mu$m at the same part.

Figure 12:
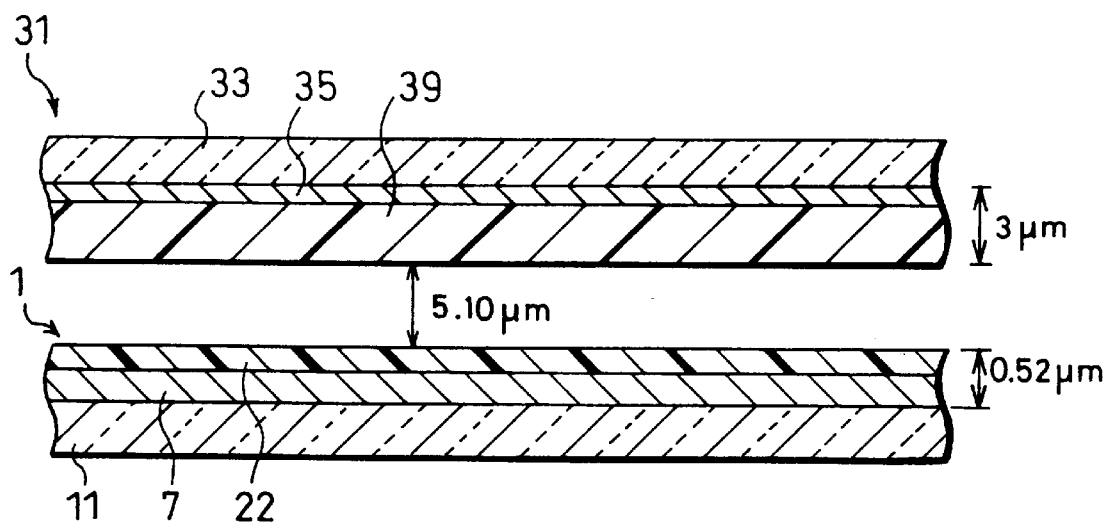
FIG. 12 is a cross-sectional view of a signal non-input side part of the foregoing liquid crystal panel.
Figure 13:
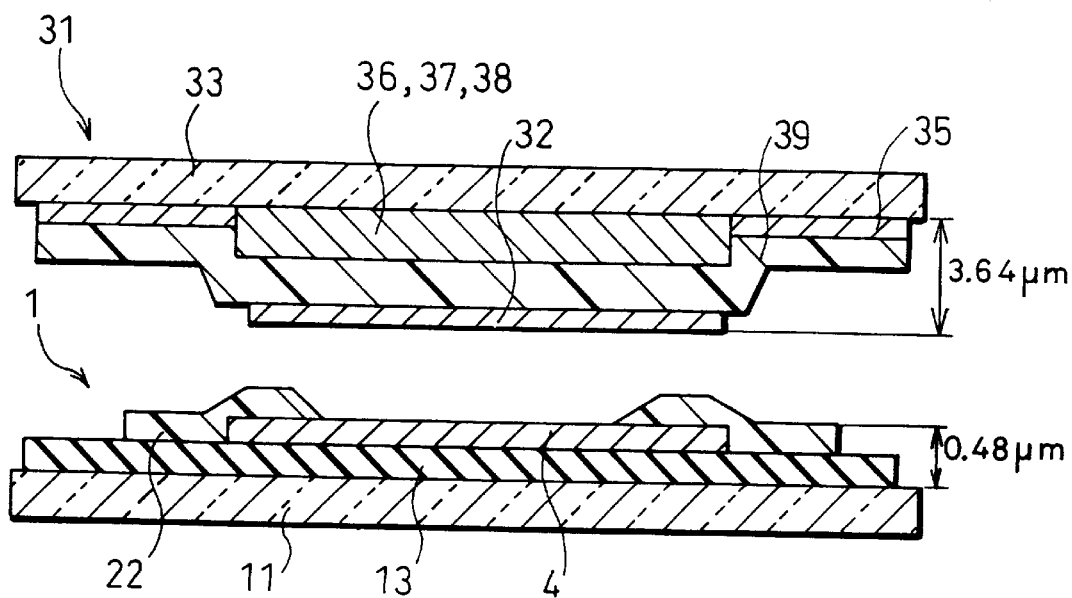
FIG. 13 is a cross-sectional view of a part inside a display area of the foregoing liquid crystal panel.

As shown in FIG. 12 which is the cross-sectional view of the liquid crystal panel of FIG. 9 viewed in the arrow $\hat{3}$ direction, a film formed on the glass substrate 11 of the pixel substrate 1 has a thickness of 0.52 $\mu$m at one of the signal non-input side parts 43 of the liquid crystal panel that is on a side opposite to the gate signal input side part 41, while the film formed on the glass substrate 33 of the counter substrate 31 has a thickness of 3 $\mu$m at the same part. Further, the cell thickness of the liquid crystal panel is 5.10 $\mu$m at the same part.

Thus, change of the cell thickness from one edge to another in the liquid crystal panel of the present embodiment can be suppressed to about ±0.2 $\mu$m, with respect to an assumed standard cell thickness of 5 $\mu$m. By reducing the change in the cell thickness, i.e., making the cell thickness substantially uniform, the display performance of the LCD device of the present embodiment can be improved.

Furthermore, since the reference signal trunk line 7, as having a property of blocking light, is also used as light blocking film outside the display area of the liquid crystal panel, the reference signal trunk line 7 and a light blocking film outside the display area of the liquid crystal panel need not be separately formed. Accordingly, the manufacturing process is simplified.

Furthermore, the sealing member is formed so as to be placed outside the black matrix 35b which is the frame-like part of the black matrix 35 on the counter substrate 31. In other words, the sealing member is disposed on the counter substrate 31 so as not to overlap the black matrix 35. Assuming that the sealing member is disposed on the black matrix 35b which is the frame-like part of the black matrix 35, the sealing member is apparently hidden behind the reference signal trunk line 7 on the pixel substrate 1 and the black matrix 35b on the counter substrate 31. This makes it impossible to discover, by eye inspection, graze on the sealing member or bubbles in the sealing member which may involve significant influence on reliability of the liquid crystal panel.

To avoid such problems, in the present embodiment, the foregoing sealing member is disposed outside the black matrix 35b which is the frame-like part of the black matrix 35, so that at least edges of the sealing member in contact with the counter substrate 31 are not obstructed by the black matrix 35b as the frame-like part of the black matrix 35 and are viewed by eye from the black matrix 35b side.

In the conventional LCD device, margins for fixation in a bezel are provided in the black matrix on the counter substrate. In the LCD device in accordance with the present embodiment, however, the sealing member is disposed outside the black matrix 35b as the frame-like part of the black matrix 35. Therefore, in the present embodiment, to position the sealing member outside the black matrix 35b without changing the size and dimensions of the liquid crystal panel, the black matrix 35b has to be narrowed in width. This makes it difficult to form the black matrix 35b wide enough to include the margin for fixation in the bezel, and hence, the reference signal trunk line 7 on the pixel substrate 1 is instead formed to have a width necessary for ensuring accuracy in agreement with the bezel.

As described above, since such provision of the sealing member makes the sealing member inspection by eye possible as for the LCD device in accordance with the present embodiment, the sealing member inspection is simplified, while further better display performance can be achieved.

[Second Embodiment]

Figure 14:
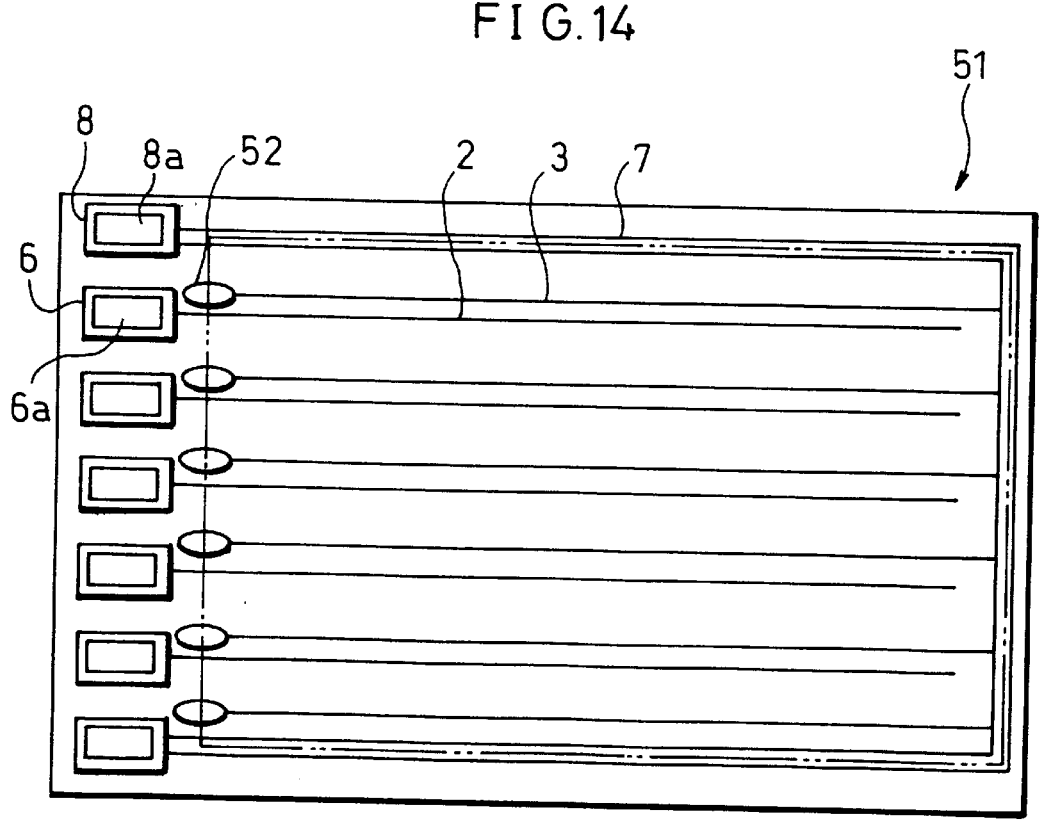
FIG. 14 is a plan view schematically illustrating an arrangement of a pixel substrate of an LCD device in accordance with a second embodiment of the present invention.

The following description will explain a second embodiment of the present invention, while referring to FIG. 14. Incidentally, the members having the same structure (function) as those in the first embodiment will be designated by the same reference numerals and their description will be omitted.

An LCD device of the present embodiment is provided with a pixel substrate 51, a counter substrate 31, and a sealing member for making the pixel substrate 51 and the counter substrate 31 adhere to each other. FIG. 14 is an explanatory view schematically illustrating the foregoing pixel substrate 51.

The pixel substrate 51 of the present embodiment is equipped with gate bus lines 2, reference signal lines 3, gate signal input terminals 6, reference signal input terminals 8, a reference signal trunk line 7, and reference signal line inspection pads (island-like metal film) 52.

The reference signal line inspection pads 52 are formed in an island form between the gate bus lines 2 on the gate signal input side, through the same step through which the gate bus lines 2 are formed. Therefore, the reference signal line inspection pads 52 are composed of the same metal films as those of the gate bus lines 2. Further, the sealing member is disposed on the reference signal line inspection pads 52, allowing the sealing member to be formed on metal films with substantially no difference in height on the pixel substrate 51.

This makes it possible to keep the gap between the pixel substrate 51 and the counter substrate 31 substantially uniform, minimizing change in the cell thickness of the liquid crystal panel, thereby ensuring good display performance.

Furthermore, as being connected with the corresponding reference signal lines 3, the reference signal line inspection pads 52 are used as terminals for use in inspection of breaking and short-circuiting of the reference signal lines 3. Therefore, island-like metal films for provision of the sealing member and terminals for reference signal line inspection need not be separately formed, thereby ensuring simplification of the manufacturing process of the pixel substrate 51.

Furthermore, as having a light blocking property, the reference signal line inspection pads 52 are used as light blocking films on the gate signal input terminals 6 side. Therefore, light blocking films need not be additionally formed on the gate signal input side of the pixel substrate 51 of the present embodiment, thereby ensuring further simplification of the manufacturing process of the pixel substrate 51.

Incidentally, the reference signal trunk line 7 and the island-like reference signal line inspection pads 52 are simultaneously formed on the pixel substrate 51, but needless to say, it is also possible to form only the reference signal line inspection pads 52 so that the sealing member provision position only on the gate signal input side has substantially no difference in height. In this case, the sealing member can be disposed under good conditions, only on the gate signal input side.

The following description will briefly describe characteristics of the liquid crystal display device in accordance with the present invention.

An LCD device in accordance with the present invention, which includes (1) a first substrate having a plurality of gate bus lines, and a plurality of reference signal lines provided parallel with the gate bus lines, (2) a second substrate having a plurality of source bus lines provided so as to cross the gate bus lines, the second substrate facing the first substrate with a predetermined gap therebetween, and (3) a sealing member for making the first and second substrates adhere to each other, is characterized in that the liquid crystal display device comprises a peripheral metal film formed through the same step through which the gate bus lines are formed, the peripheral metal film being positioned along three side edges of the first substrate, the three side edges being the side edges of the first substrate other than one side edge thereof on a gate signal input side, and that parts of the sealing member along the three side edges fall on the peripheral metal film.

According to the foregoing arrangement, the peripheral metal film provided along the three side edges of the first substrate which are the side edges of the first substrate except one side edge on the gate signal input side are formed through the same step through which the gate bus lines are formed. Therefore, the peripheral metal film and the gate bus lines are composed of the same metal film, thereby resulting in that the sealing member formed on the peripheral metal film falls on top of metal films having substantially no difference in height on the first substrate.

Besides, the provision of the sealing member on the peripheral metal film makes it possible to keep the gap between the substrates substantially uniform, with substantially no change in the gap from the gate signal input side to the source signal input side.

This makes it possible to keep the gap between the first substrate and the second substrate substantially uniform in the vicinity of parts where the sealing member is applied, minimizing change in the cell thickness of the liquid crystal panel, thereby resulting in that good display performance can be achieved.

The LCD device in accordance with the present invention is preferably further arranged so that the peripheral metal film is a reference signal trunk line for supplying a reference signal to each of the reference signal lines.

With the foregoing arrangement wherein the peripheral metal film is used as the reference signal trunk line for supplying the reference signal to the reference signal lines, the peripheral metal film for cancelling differences in height in the area where the sealing member is provided and the reference signal trunk line for supplying the reference signal to the reference signal lines need not be separately formed on the first substrate.

Since the peripheral metal film is not additionally provided outside the reference signal trunk line on the first substrate, the frame of the liquid crystal panel can be made smaller, while the display area in the liquid crystal panel can be made larger. Furthermore, the manufacturing process can be simplified.

The LCD device in accordance with the present invention is preferably further arranged so that the peripheral metal film has a light blocking property.

With the foregoing arrangement wherein the peripheral metal film has a light blocking property, the peripheral metal film can be used so as to also serve as a light blocking film outside the display area of the liquid crystal panel.

This makes it unnecessary to additionally provide a light blocking film outside the display area of the liquid crystal panel, thereby simplifying the manufacturing process, as compared with the case where the peripheral metal film and the light blocking film are separately formed.

Furthermore, it is possible to arrange an LCD device in accordance with the present invention which includes (1) a first substrate having a plurality of gate bus lines, and a plurality of reference signal lines provided parallel with the gate bus lines, (2) a second substrate having a plurality of source bus lines provided so as to cross the gate bus lines, the second substrate facing the first substrate with a predetermined gap therebetween, and (3) a sealing member for making the first and second substrates adhere to each other, so that the LCD device further includes a plurality of island-like metal films provided between the gate bus lines, on a gate signal input side of the first substrate, through the same step through the gate bus lines are formed, and that parts of the sealing member formed on the gate signal input side of the first substrate fall on the island-like metal films.

According to the foregoing arrangement, the island like metal films are formed through the same step through which the gate bus lines are formed, between the gate bus lines, on the gate signal input side. Therefore, the peripheral metal film and the gate bus lines are composed of the same metal film, thereby resulting in that the sealing member formed on the island-like metal films falls on top of metal films having substantially no difference in height, on the gate signal input side on the first substrate.

This makes it possible to provide the sealing member under good conditions on the gate signal input side, to keep the gap between the first and second substrates substantially uniform, thereby ensuring good states of the liquid crystal panel in terms of the cell thickness, which leads to good display performance. Furthermore, by adapting material with a light blocking property so as to form the island-like metal films, the light blocking property on the gate signal input side can be enhanced.

The LCD device in accordance with the present invention is preferably further arranged so that the island-like metal films are connected with the reference signal lines so as to be used as terminals for use in inspection of breaking and short-circuiting of the reference signal lines.

The foregoing arrangement ensures use of the island-like metal films as terminals for use in inspection of breaking and short-circuiting of the reference signal lines, as the island-like metal films are connected with the reference signal lines.

This arrangement makes it unnecessary to further provide terminals for use in inspection of breaking and short-circuiting of the reference signal lines, thereby simplifying the manufacturing process, as compared with the case where the island-like metal films and the inspection-use terminals are separately formed.

The LCD device in accordance with the present invention is preferably further arranged so that the island-like metal films have a light blocking property.

With the foregoing arrangement wherein the island-like metal films have a light blocking property, the island-like metal films can be used so as to also serve as a light blocking film on the gate signal input side.

This makes it unnecessary to further provide the light blocking film on the gate signal input side, thereby simplifying the manufacturing process, as compared with the case where the island-like metal films and the light blocking film on the gate signal input side are separately formed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device, comprising:
   a first substrate having a plurality of gate bus lines, and a plurality of reference signal lines provided parallel with said gate bus lines;
   a second substrate having a plurality of source bus lines provided so as to cross said gate bus lines, said second substrate facing said first substrate with a predetermined gap therebetween;
   a sealing member for making said first and second substrates adhere to each other; and
   a peripheral metal film formed through the same step through which said gate bus lines are formed, said peripheral metal film being positioned along three side edges of said first substrate, said three side edges being the side edges of said first substrate other than one side edge thereof on a gate signal input side,
   wherein parts of said sealing member along said three side edges are positioned on said peripheral metal film.

2. The liquid crystal display device set forth in claim 1, wherein said peripheral metal film is a reference signal trunk line for supplying a reference signal to each of said reference signal lines.

3. The liquid crystal display device set forth in claim 2, wherein said peripheral metal film has a light blocking property.

4. The liquid crystal display device set forth in claim 1, wherein said peripheral metal film has a light blocking property.

5. The liquid crystal display device set forth in claim 1, wherein:
   said second substrate further includes a light blocking film for preventing areas not in use for display from transmitting light, to ensure contrast; and
   said sealing member is disposed so as not to overlap said light blocking film on said second substrate.

6. The liquid crystal display device set forth in claim 1, further comprising a plurality of island-like metal films, said island-like metal films being formed on the gate signal input side, between said gate bus lines, through the same step through which said gate bus lines are formed,
   wherein parts of said sealing member formed on the gate signal input side of said first substrate are positioned on said island-like metal films.

7. The liquid crystal display device set forth in claim 6, wherein said island-like metal films are connected with said reference signal lines so as to be used as terminals for use in inspection of breaking and short-circuiting of said reference signal lines.

8. The liquid crystal display device set forth in claim 7, wherein said island-like metal films have a light blocking property.

9. The liquid crystal display device set forth in claim 6, wherein said island-like metal films have a light blocking property.

10. The liquid crystal display device set forth in claim 1, wherein each of said gate bus lines and reference signal lines is composed of a trilaminar continuous film of TaN/Ta/TaN.

11. A liquid crystal display device, comprising:
    a first substrate having a plurality of gate bus lines, and a plurality of reference signal lines provided parallel with said gate bus lines;
    a second substrate having a plurality of source bus lines provided so as to cross said gate bus lines, said second substrate facing said first substrate with a predetermined gap therebetween;

a sealing member for making said first and second substrates adhere to each other; and a plurality of island-like metal films provided between said gate bus lines, on a gate signal input side of said first substrate, through the same step through which said gate bus lines are formed, wherein parts of said sealing member formed on the gate signal input side of said first substrate are positioned on said island-like metal films.

12. The liquid crystal display device set forth in claim 11, wherein said island-like metal films are connected with said reference signal lines so as to be used as terminals for use in inspection of breaking and short-circuiting of said reference signal lines.

13. The liquid crystal display device set forth in claim 12, wherein said island-like metal films have a light blocking property.

14. The liquid crystal display device set forth in claim 11, wherein said island-like metal films have a light blocking property.

* * * * *